United States Patent [19]

Shields

[11] Patent Number: 4,576,380
[45] Date of Patent: Mar. 18, 1986

[54] CAST METAL BREAKER APPARATUS

[76] Inventor: D. Leet Shields, P.O. Box 125, Edgeworth, Pa. 15056

[21] Appl. No.: 599,662

[22] Filed: Apr. 12, 1984

[51] Int. Cl.$^4$ ............................................. B23P 17/02
[52] U.S. Cl. ............................................. 225/104; 83/605
[58] Field of Search ............ 225/104, 105, 103, 96.5; 83/605, 607, 609, 599

[56]  References Cited

U.S. PATENT DOCUMENTS

| | | | |
|---|---|---|---|
| 1,112,146 | 9/1914 | Ladd et al. | 225/104 X |
| 1,577,154 | 3/1926 | Ambler | 225/104 |
| 2,551,268 | 5/1951 | Hoffman | 83/859 X |
| 3,196,727 | 7/1965 | Pray | 83/607 X |
| 3,205,747 | 9/1965 | Guth | 83/605 |
| 3,866,522 | 2/1975 | Oswalt, Jr. | 83/605 X |
| 4,156,377 | 5/1979 | Bracewell | 83/599 X |
| 4,297,931 | 11/1981 | Lessard | 83/599 X |

OTHER PUBLICATIONS

Drawing No. 122-0-01, dated 6/18/80, entitled "Test Coupon Cutter" drawn by D.L.S.

Primary Examiner—Frank T. Yost
Attorney, Agent, or Firm—Webb, Burden, Robinson & Webb

[57] ABSTRACT

A breaker apparatus having a base including spaced parallel side members and a bottom plate connected to the lower edge of each side member. A fixed king pin extends between the side members and a breaker arm is rotatably mounted on the king pin. A hydraulic cylinder is pivotally mounted on the base, and the rod extending from the cylinder is pivotally connected to the rear end of the breaker arm so that extension of the rod from the cylinder pivots the breaker arm about the king pin to rotate the forward end of the breaker arm downwardly to contact a metal piece lying on the upper forward corners of the side members.

12 Claims, 3 Drawing Figures

CAST METAL BREAKER APPARATUS

BACKGROUND OF THE INVENTION

The invention is generally directed to apparatus for breaking pieces of cast iron such as runners and sprues which are formed when casting parts in a foundry. Runners and sprues are formed when iron is cast into molds, and in order to charge this metal into a melting furnace, it is often necessary that they be broken into smaller pieces which can be easily handled.

DESCRIPTION OF THE PRIOR ART

In the prior art, the solidified cast iron runners and sprues were cut into smaller pieces using a cutting torch or were cut into smaller pieces by alligator shears.

SUMMARY OF THE INVENTION

The invention is directed to cast metal breaking apparatus having a base and a hydraulically operated breaker arm for breaking cast iron runners and sprues which are formed in metal casting. The base is stationary and is fixed to a support frame or to the foundry floor. The base has spaced substantially parallel side members which are welded to a bottom plate, and a fixed king pin is carried by the side members. The breaker arm is pivotally mounted on the king pin for rotary movement relative to the base. The forward contact end of the pivotally mounted breaker arm carries a knife or insert made of a high strength alloy which contacts a runner or a sprue lying between spaced high strength alloy inserts supported on the side members to break the runner or sprue. The rear end of the breaker arm is pivotally attached to a rod eye which is threaded to the free end of a piston rod of a hydraulic cylinder which is pivotally mounted on the base. Extension of the piston rod from the hydraulic cylinder rotates the forward end of the breaker arm downwardly to bring the knife into contact with a runner or a sprue resting on the inserts supported on the side members, and continued extension of the rod breaks the runner or sprue into two or more pieces. The cast metal runners and sprues which are capable of being broken in this manner are relatively brittle, and therefore they will fracture when force is applied to them by the forward end of the breaker arm before substantial deformation of the metal pieces takes place. After the runner or sprue is broken, the piston rod is retracted into the cylinder, and the forward end of the breaker arm is raised so that another runner or sprue can be placed across the spaced inserts on the side members.

DESCRIPTION OF THE PREFERRED EMBODIMENT

Figure 2:
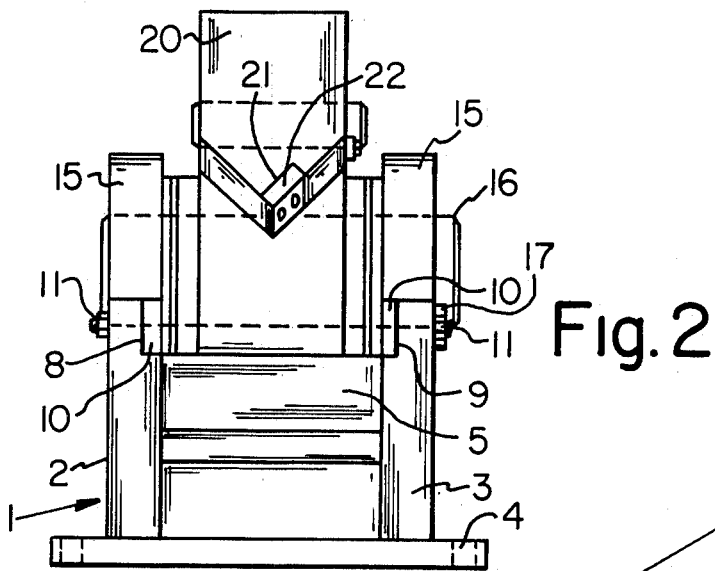
FIG. 2 is a front elevation of the breaker apparatus with the breaker arm in the raised position.

With reference to the drawings, the breaker apparatus includes a base 1 which has spaced vertical substantially parallel side members 2 and 3 which are welded at their lower edge to a horizontal bottom plate 4. A number of structural support members 5, 6 and 7 extend between spaced side members 2 and 3 and are welded to the facing surfaces of the side members in order to impart rigidity to the base. The upper forward corner of each side member 2 and 3 is formed with an inwardly directed notch 8 and 9 respectively. A high strength alloy rectangular insert 10 is located within each notch 8 and 9. Each insert is held in place by bolts 11 which extend through the insert and the side member. The end of each bolt 11 extends outwardly of the side member carrying the insert, and a nut is threaded on the outer end of each bolt.

Each side member is formed with an upwardly extending rounded portion 15 between its ends. The rounded portions are formed with aligned openings, and a stationary king pin 16 is supported in the aligned openings. The king pin is held against longitudinal movement relative to the side members by an elongated member 17 which fits into a slot on one end of the king pin and is bolted to the exterior surface of side member 3 by bolts 18.

Breaker arm 20 is mounted for rotation about stationary king pin 16. The lower surface of the forward end or nose of breaker arm 20 is formed in the shape of a V, and a notch 21 is cut in one side of the V as best shown in FIG. 2 of the drawings. A high strength alloy knife 22 is located in notch 21 and is held in place with countersunk bolts 23 which extend into threaded holes in the breaker arm. The rear end of the breaker arm is formed with an elongated downwardly opening recess 24 which receives the upper end of a rod eye or knuckle 30 which is held in place by a pivot pin 31 which is supported in aligned holes in the breaker arm on opposite sides of recess 24. Pivot pin 31 is fixed in the breaker arm and is held against longitudinal movement by an elongated member 32 which fits into a slot in the end of the pivot pin and is bolted to the exterior of the breaker by bolts 33. The lower end of rod eye 30 is formed with an internally threaded elongated cylindrical recess which is threadedly connected to the upper end of a piston rod 34 which extends from a hydraulic cylinder 35. This hydraulic cylinder extends downwardly between spaced side members 2 and 3 and is pivotally mounted on a pivot pin 36 which is carried in opposed trunnion mounts 37. Each trunnion mount is bolted to the upper edge of a side member, and a shear lug 38 is welded to the upper edge of each side plate at the forward and rearward ends of each trunnion mount in order to prevent chatter of the trunnion mounts in the forward and rearward directions when the hydraulic cylinder pivots about pin 36. The flow of hydraulic fluid to and from hydraulic cylinder 35 is controlled by a standard four-way valve located in an operator manipulator cab which is well known to those skilled in the art and forms no part of the instant invention.

Each outer horizontal edge of base plate 4 is provided with holes 40 at the forward and rearward ends for mounting the breaker apparatus and with leveling screws 41 for leveling the breaker apparatus when it is installed in the foundry. Since the lower end of hydraulic cylinder 35 extends downwardly below the bottom of base plate 4, it is necessary that the base plate be elevated above the floor to permit rotation of the hydraulic cylinder 35 about pivot pin 36 or that a pit be formed in the foundry floor within which the lower end of the hydraulic cylinder is located. The pit must have a size sufficient to permit rotation of hydraulic cylinder 35 about pivot pin 36 when the breaker arm is rotated about king pin 16.

Figure 1:
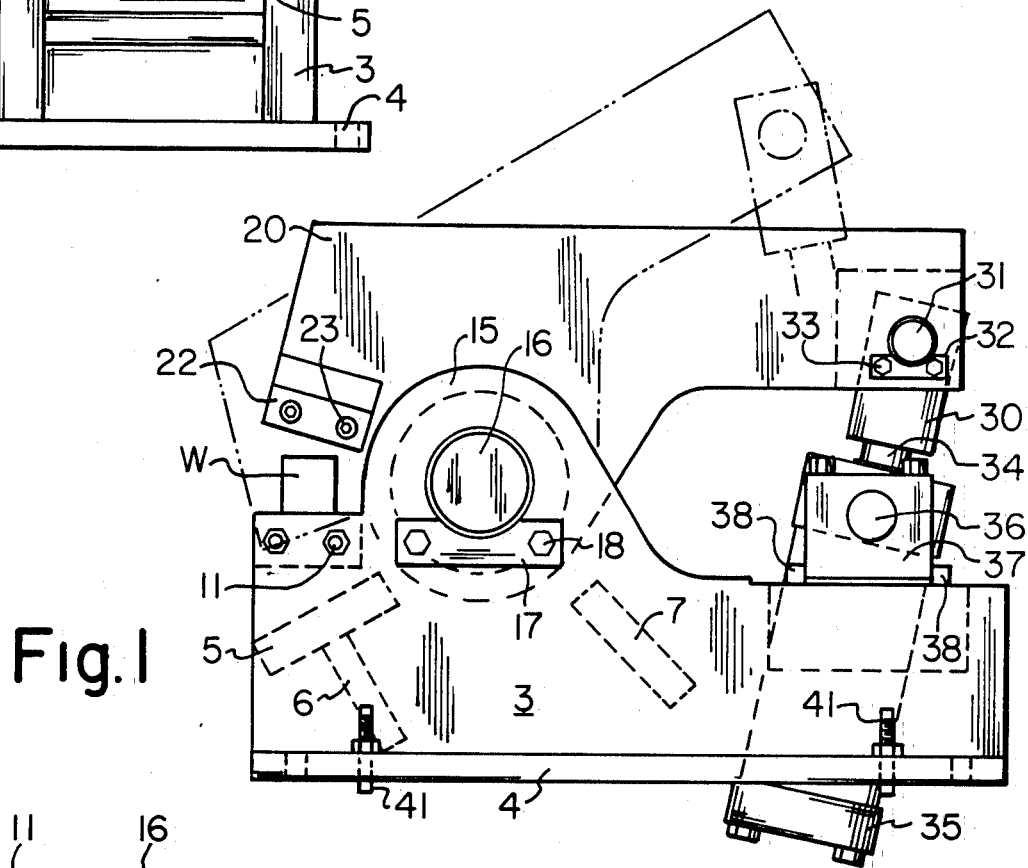
FIG. 1 is a side elevation of the breaker apparatus with the breaker arm shown in the raised position in solid lines and in the lower position in dotted lines.
Figure 3:
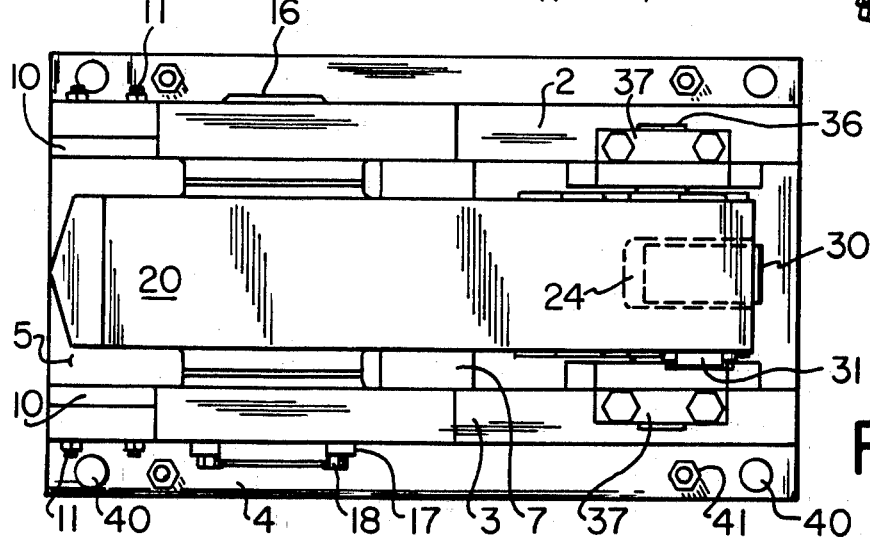
FIG. 3 is a plan view of the breaker apparatus.

In operation, when the breaker arm is in the raised position as shown in solid lines in FIG. 1 of the drawings, a cast iron runner or sprue W is placed across the ends of side members 2 and 3 so that it rests on the upper edge of the side members and the upper surfaces of inserts 10. Piston rod 34 is then extended upwardly from hydraulic cylinder 35 to rotate breaker arm 20 about king pin 16 and lower the V-shaped nose of the breaker arm until the edge of knife 22 on the forward end of the breaker arm contacts a cast metal member W resting on the upper front corner of the sidewalls and continued force by the hydraulic cylinder forces the front end of the breaker arm in a downward direction to break the cast metal piece W lying across the front corners of the side members because the metal is brittle.

It is pointed out that support member 5 is positioned at an angle to the horizontal so that if a piece of metal falls between the side members, it will be deflected out of the breaker apparatus by the structural member. However, generally the pieces of metal will fall outside of the side members because of the length of the runner or sprue which is broken.

While a preferred embodiment of the invention has been described herein, it is to be understood that it may be embodied within the scope of the appended claims.

I claim:

1. Breaker apparatus having a fixed base including a bottom plate and spaced substantially parallel side members having their lower edges attached to said bottom plate, a fixed king pin extending between and supported by said side members, a breaker arm rotatably mounted on said fixed king pin, a hydraulic cylinder located between said side members, means on each of said side members pivotally mounting said hydraulic cylinder on said side members, a shear lug welded to each of said side members at the forward end and the rear end of each of said means pivotally mounting said hydraulic cylinder on said side members to prevent chatter of said means pivotally mounting said hydraulic cylinder on said side members when said hydraulic cylinder rotates about said means pivotally mounting said hydraulic cylinder, a rod extending from said cylinder and pivotally connected to the rear end of said breaker arm and a knife at the forward end of said breaker arm, whereby extension of said rod from said cylinder pivots said breaker arm about said fixed king pin to rotate said knife in a downward arc to contact a metal piece extending between the forward upper corners of said side members to break the metal piece.

2. Apparatus as set forth in claim 1 including a notch at the inner upper corner of each of said side members, a high strength alloy insert located in each of said notches and means attaching each of said inserts to a side member.

3. Apparatus as set forth in claim 2 including a plurality of structural members extending between and welded to the facing surfaces of said side members to impart rigidity to said base, one of said structural members being located at the forward end of said members and below said inserts and having an angle relative to said bottom plate, whereby metal pieces which fall between the front ends of said side members are directed by said angled structural member to fall outside of said base.

4. Apparatus as set forth in claim 1 wherein the forward end of said breaker arm has a V-shape, a notch formed in one leg of said V to hold said knife and means attaching said knife to said breaker arm.

5. Apparatus as set forth in claim 1 including a slot formed in said king pin adjacent to one end and outwardly of one of said side members and an elongated member located partially within said slot, said elongated member being bolted to said one of said side members to prevent longitudinal movement of said king pin relative to said side members.

6. Apparatus as set forth in claim 1 including a plurality of leveling screws carried on said bottom plate, whereby said breaker apparatus may be leveled when it is installed.

7. Breaker apparatus having a fixed base including a bottom plate and spaced substantially parallel side members having their lower edges attached to said bottom plate, a fixed king pin extending between and supported by said side members, a breaker arm rotatably mounted on said fixed king pin, a trunnion mount attached to the upper edge of each of said side members, a hydraulic cylinder located between said side members, a pivot pin extending between said trunnion mounts and said hydraulic cylinder to pivotally support said hydraulic cylinder on said side members, a shear lug attached to the upper edge of each of said side members at the forward and rear ends of each trunnion mount to prevent chatter of said trunnion mounts when said cylinder rotates about said pivot pin and a rod extending from said hydraulic cylinder and pivotally connected to the rear end of said breaker arm, whereby extension of said rod from said cylinder pivots said breaker arm about said king pin to rotate the forward end of said breaker arm in a downward direction to contact a metal piece extending between the forward upper corners of said side members to break the metal piece.

8. Apparatus as set forth in claim 7 including a notch at the inner upper corner of each of said side members, a high strength alloy insert located in each of said notches and means attaching each of said inserts to a side member.

9. Apparatus as set forth in claim 8 including a plurality of structural members extending between and attached to the facing surfaces of said side members to impart rigidity to said base, one of said structural members being located at the forward end of said side members and below said inserts and having an angle relative to said bottom plate, whereby metal pieces which fall between the front ends of said side members are directed by said angled structural member to fall outside of said base.

10. Apparatus as set forth in claim 7 wherein the forward end of said breaker arm has a V-shape, a notch formed in one leg of said V and a high strength alloy knife located in said notch and means attaching said knife to said breaker arm.

11. Apparatus as set forth in claim 7 including a slot formed in said king pin adjacent to one end and outwardly of one of said side members and an elongated member located partially within said slot, said elongated member being bolted to said one of said side members to prevent longitudinal movement of said king pin relative to said side members.

12. Apparatus as set forth in claim 7 including a plurality of leveling screws carried on said bottom plate, whereby said breaker apparatus may be leveled when it is installed.

* * * * *